(12) United States Patent
Lee

(10) Patent No.: US 8,432,604 B2
(45) Date of Patent: Apr. 30, 2013

(54) METHODS OF FORMING TRANSPARENT STRUCTURES AND ELECTROCHROMIC DEVICES

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 10 days.

(21) Appl. No.: 13/151,080

(22) Filed: Jun. 1, 2011

(65) Prior Publication Data

US 2011/0226738 A1    Sep. 22, 2011

Related U.S. Application Data

(62) Division of application No. 12/550,547, filed on Aug. 31, 2009, now Pat. No. 7,973,997.

(51) Int. Cl.
  G02F 1/153   (2006.01)
  B29D 11/00   (2006.01)
  B05D 5/06   (2006.01)

(52) U.S. Cl.
  USPC ............ 359/275; 264/1.7; 427/164; 977/712; 977/932

(58) Field of Classification Search .................. 264/1.24, 264/1.34, 1.7; 359/275, 609, 614; 427/162, 427/164; 428/34, 156; 977/712, 932
  See application file for complete search history.

(56) References Cited

U.S. PATENT DOCUMENTS

| 6,122,093 | A | 9/2000 | Lynam |
| 6,939,611 | B2 | 9/2005 | Fujishima et al. |
| 2006/0096967 | A1 | 5/2006 | Weiss |
| 2008/0107799 | A1 | 5/2008 | Lu et al. |
| 2009/0085235 | A1 | 4/2009 | Burkle et al. |
| 2009/0174925 | A1 | 7/2009 | Weber et al. |
| 2010/0203454 | A1 | 8/2010 | Brongersma et al. |
| 2010/0294741 | A1* | 11/2010 | Lee .................................. 216/41 |

FOREIGN PATENT DOCUMENTS

| GB | 2 023 867 | 1/1980 |
| JP | 2004502625 | 1/2004 |
| JP | 2004109904 | 4/2004 |
| JP | 2010222199 | 10/2010 |
| WO | 03/039856 | 5/2003 |
| WO | 08/069848 | 6/2008 |

OTHER PUBLICATIONS

Avendano et al "Electrochromic materials and devices: Brief survey and new data on optical absorption in tungsten oxide and nickel oxide films" Thin Solid Films, vol. 496, Issue 1, Feb. 1, 2006, pp. 30-36.
International Search Report and Written Opinion mailed Nov. 23, 2010 for International Application No. PCT/KR2010/005739.
U.S. Appl. No. 12/550,547, Mail Date Dec. 13, 2010, Office Action.
U.S. Appl. No. 12/550,547, Mail Date Mar. 7, 2011, Notice of Allowance.
Chowdhury, H. et al., "Radiative Heat Transfer Across Glass Coated With Gold Nano-Particles," Journal of Solar Energy Engineering, vol. 127, No. 1, pp. 70-75, Feb. 2005.

* cited by examiner

Primary Examiner — David N Spector
(74) Attorney, Agent, or Firm — Workman Nydegger

(57) ABSTRACT

Transparent structures, electrochromic devices, and methods for making such structures/devices are provided. A transparent structure may include a transparent substrate having a plurality of micro- or nano-scale structures, at least one substance configured to block near-infrared or infrared radiation and partially cover at least substantial portions of the substrate and the plurality of micro- or nano-scale structures, and at least one photocatalyst configured to at least partially cover an outermost surface of the transparent structure.

20 Claims, 12 Drawing Sheets

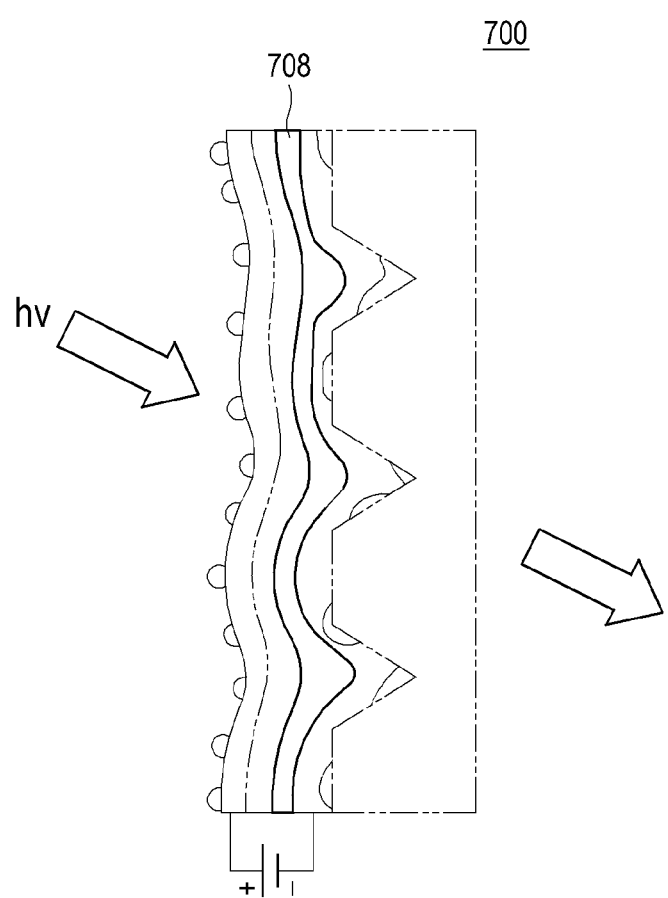

METHODS OF FORMING TRANSPARENT STRUCTURES AND ELECTROCHROMIC DEVICES

CROSS-REFERENCE TO RELATED APPLICATIONS

This application is a divisional of U.S. application Ser. No. 12/550,547, filed 31 Aug. 2009, which is incorporated herein, in its entirety, by this reference.

TECHNICAL FIELD

The present disclosure generally relates to transparent structures.

BACKGROUND

Advances in nanotechnology have allowed nano-materials to be applied to various fields of technology, leading to products with unique mechanical, chemical, and electrical properties. Micro- and nano-scale surface morphologies affect the properties of a surface and are important for a number of commercial applications. For example, surfaces that mimic the texture of lotus leaves have attracted a great deal of attention in many industrial areas due to the surface properties that make them potentially useful in various applications, such as windows or external surfaces of electrical equipment, optics, automobiles, aircrafts, building materials, home appliances, and electronics.

SUMMARY

Embodiments of transparent structures, electrochromic devices, and methods for making such structures/devices are disclosed herein. In accordance with one embodiment by way of non-limiting example, a transparent structure includes a transparent substrate having a plurality of micro- or nano-scale structures configured to provide a rough surface on the substrate, at least one substance configured to block near-infrared or infrared radiation and partially cover at least substantial portions of the substrate and the plurality of micro- or nano-scale structures, and at least one photocatalyst configured to at least partially cover an outermost surface of the transparent structure.

In another embodiment, an electrochromic device includes a transparent substrate having a plurality of micro- or nano-scale structures configured to provide a rough surface on one side of the substrate, at least one substance configured to block near-infrared or infrared radiation and partially cover at least substantial portions of the substrate and the plurality of micro- or nano-scale structures, and at least one photocatalyst configured to at least partially cover an outermost surface of the electrochromic device.

In another embodiment, a method for making a transparent structure includes forming a plurality of micro- or nano-scale structures on at least one side of a transparent substrate to provide a rough surface on the substrate, depositing at least one substance configured to block near-infrared or infrared radiation on at least substantial portions of the substrate and the plurality of micro- or nano-scale structures, and coating at least substantial portions of an outermost surface of the transparent structure with at least one photocatalyst.

In another embodiment, a method for making an electrochromic device includes forming a plurality of micro- or nano-scale structures on one side of a transparent substrate to provide a rough surface on the substrate, depositing at least one substance configured to block near-infrared or infrared radiation on at least substantial portions of the substrate and the plurality of micro- or nano-scale structures, and coating at least substantial portions of an outermost surface of the electrochromic device with at least one photocatalyst.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 8A-8B show an illustrative embodiment of the electrochromic device depicted in FIG. 7 being used as a window having variable transmittance.

DETAILED DESCRIPTION

Figure 1:
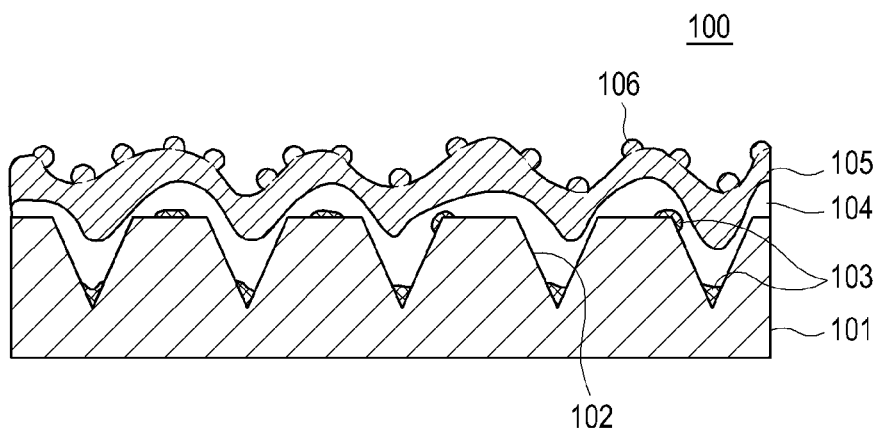
FIG. 1 shows an illustrative embodiment of a transparent structure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Referring to FIG. 1, an illustrative embodiment of a transparent structure 100 is shown. In some embodiments, the transparent structure 100 optionally includes one or more of a transparent substrate 101, a plurality of micro- or nano-scale structures 102, at least one substance 103 configured to block near-infrared or infrared radiation (hereinafter referred to as "substance 103"), at least one transparent conductive substance 104, and at least one photocatalyst 105, 106. As illustrated in FIG. 1, the plurality of micro- or nano-scale structures 102 may be configured to provide a rough surface on the substrate 101. While the surface of the substrate 101 may be rough on the micro scale, the outermost surface of the transparent structure 100 is generally smooth on the macro scale, meaning that the outermost surface of the transparent structure 100 appears generally even to the naked eye. The substance 103 configured to block near-infrared or infrared radiation may be configured to partially or completely cover at least substantial portions of the substrate 101 and the plurality of micro- or nano-scale structures 102. The at least one transparent conductive substance 104 may be interposed between the substance 103 configured to block near-infrared or infrared radiation and the at least one photocatalyst 105, 106. The at least one photocatalyst 105, 106 may be configured to at least partially cover an outermost surface of the transparent structure 100.

The transparent substrate 101 may be made of a variety of materials including, but not limited to, a glass, a polymer, or a combination thereof. In some embodiments, the glass may include, but is not limited to, one or more of soda-lime glass, quartz glass, borosilicate glass, acrylic glass, sugar glass, isinglass (Muscovy glass), aluminum oxynitride, and the like. Further, the polymer may be, without limitation, one or more of acryl resin, polycarbonate, polyester, cellulose, polyethylene, polyethylene terephthalate, polypropylene, polyolefin, polyvinyl chloride, phenolic resin, polyvinyl butyral, and polyurethane.

The transparent substrate 101 may have, without limitation, a thickness of from bout 0.1 µm to about 5 cm. In some embodiments, the thickness of the transparent substrate 101 may range from about 1 µm to about 5 cm, from about 5 µm an to about 5 cm, from about 10 µm to about 5 cm, from about 50 µm an to about 5 cm, from about 100 µm an to about 5 cm, from about 500 µm an to about 5 cm, from about 1 cm to about 5 cm, from about 2 cm to about 5 cm, from about 0.1 µm an to about 1 µm, from about 0.1 µm an to about 5 µm, from about 0.1 µm an to about 10 µm, from about 0.1 µm an to about 50 µm, from about 0.1 µm an to about 100 µm, from about 0.1 µm an to about 500 µm, from about 0.1 µm an to about 1 cm, from about 0.1 µm an to about 2 cm, from about 1 µm an to about 5 µm, from about 5 µm to about 10 µm, from about 10 µm an to about 50 µm, from about 50 µm an to about 100 µm, from about 100 µm an to about 500 µm, from about 500 µm an to about 1 cm, or from about 1 cm to about 2 cm. In other embodiments, the thickness of the transparent substrate 101 may be about 0.1 µm, about 1 µm, about 5 µm, about 10 µm, about 50 µm, about 100 µm, about 500 µm, about 1 cm, about 2 cm, or about 5 cm.

Figure 4:
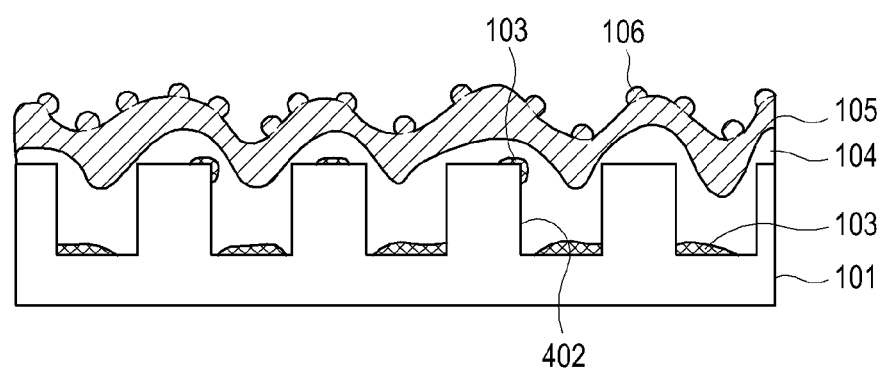
FIG. 4 shows another illustrative embodiment of a transparent structure.
Figure 5:
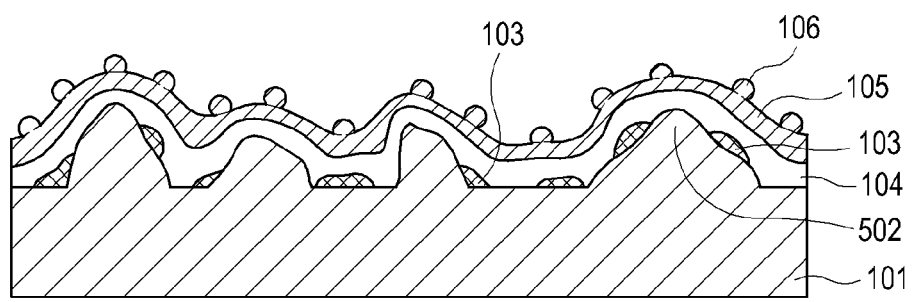
FIG. 5 shows another illustrative embodiment of a transparent structure.
Figure 6:
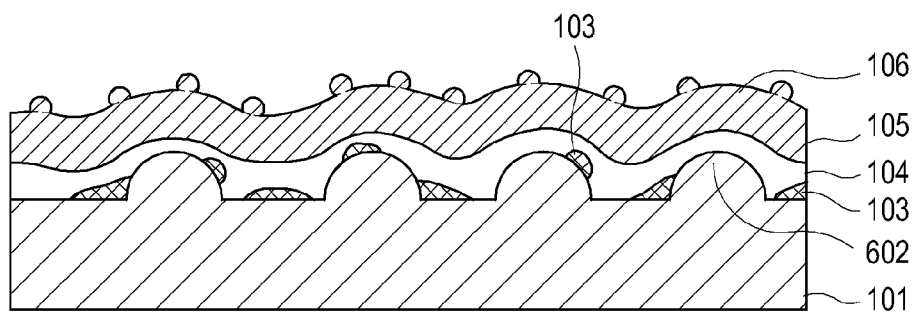
FIG. 6 shows another illustrative embodiment of a transparent structure.
Figure 10:
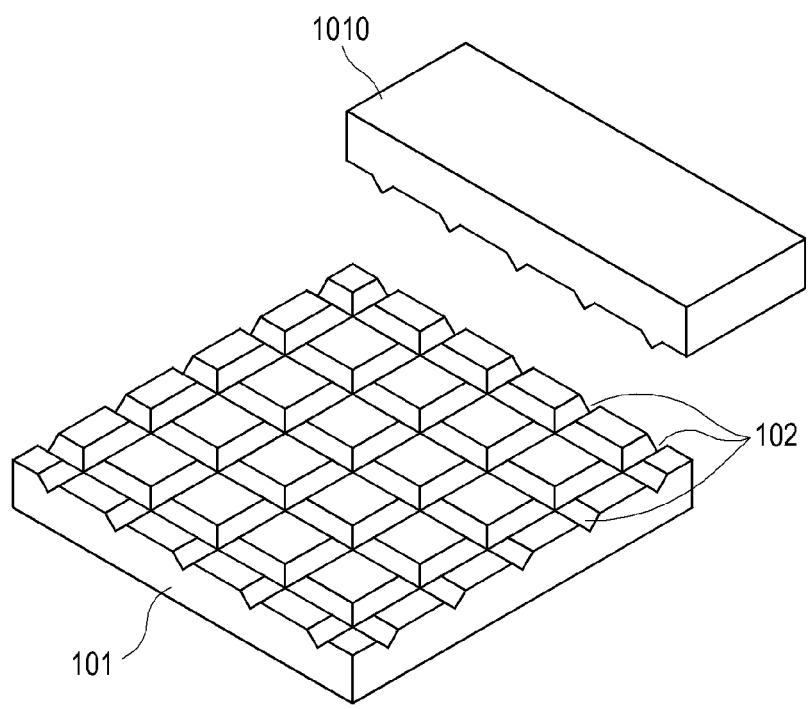
FIG. 10 shows a perspective view of an illustrative embodiment of a method of forming a plurality of micro- or nano-scale structures having a recessed shape on a substrate.
Figure 11:
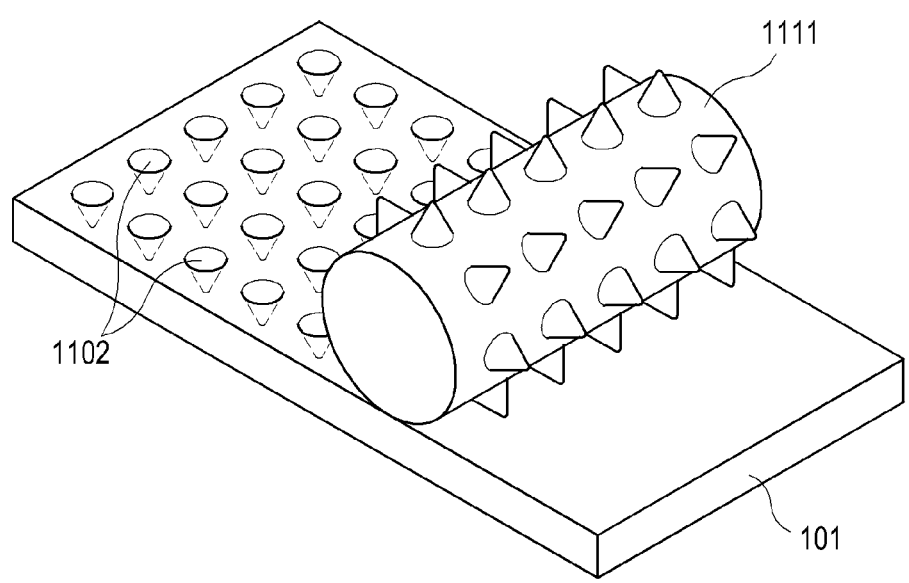
FIG. 11 shows a perspective view of another illustrative embodiment of a method of forming a plurality of micro- or nano-scale structures having a recessed shape on a substrate.
Figure 12:
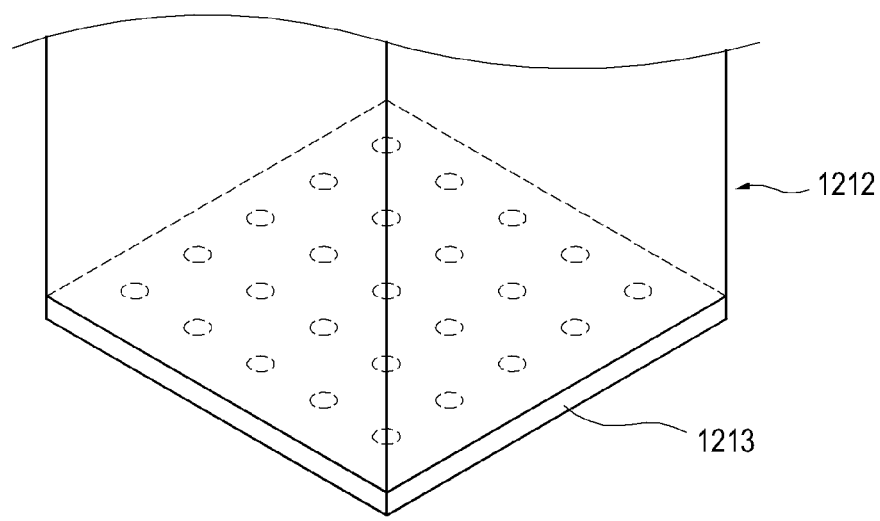
FIG. 12 shows a perspective view of another illustrative embodiment of a method of forming a plurality of micro- or nano-scale structures having a raised shape on a substrate.
Figure 12:
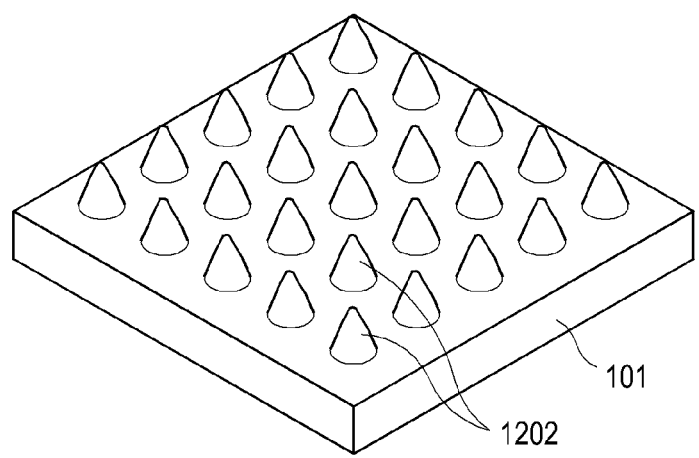

In the present disclosure, "micro- or nano-scale structures" encompass both recessed and raised formations on a surface having various shapes including, but not limited to, cones, rods, semi-spheres, V- or U-shaped ditches, etc. In some embodiments, the plurality of micro- or nano-scale structures 102 may be configured to have a recessed or indented shape, as illustrated in FIGS. 1-4 and 10-11. As a non-limiting example, the plurality of micro- or nano-scale structures may be concave formations, such as V-shaped ditches as illustrated in FIGS. 1-3 and 10 or U-shaped ditches as depicted in FIG. 4. In other embodiments, the plurality of micro- or nano-scale structures may be configured to have a raised or protruding shape, as illustrated in FIGS. 5-6 and 12. As a non-limiting example, the plurality of micro- or nano-scale structures may have semi-sphere shapes as depicted in FIG. 6 or cone-like shapes as illustrated in FIG. 12.

In certain embodiments, each of the plurality of micro- or nano-scale structures may be configured to have similar shapes and sizes, as illustrated in FIGS. 1-4, 6 and 10-12. In other embodiments, the plurality of micro- or nano-scale structures may have variable shapes and sizes, as illustrated in FIG. 5.

As used herein, "micro- or nano-scale structures" refer to recessed or raised formations on a surface having an intermediate size between molecular and microscopic dimensions. Regardless of shape, the plurality of micro- or nano-scale structures may have, without limitation, an average size of from about 100 nm to about 10 µm. In some embodiments, the average size of the micro- or nano-scale structures may range from about 200 nm to about 10 µm, from about 400 nm to about 10 µm, from about 600 nm to about 10 µm, from about 800 nm to about 10 µm, from about 1 µm to about 10 µm, from about 2 µm to about 10 µm, from about 5 µm to about 10 µm, from about 100 nm to about 200 nm, from about 100 nm to about 400 nm, from about 100 nm to about 600 nm, from about 100 nm to about 800 nm, from about 100 nm to about 1 µm, from about 100 nm to about 2 µm, from about 100 nm to about µm, from about 200 nm to about 400 nm, from about 400 nm to about 600 nm, from about 600 nm to about 800 nm, from about 800 nm to about 1 µm, from about 1 µm to about 2 µm, or from about 2 µm to about 5 µm. In other embodiments, the average size of the micro- or nano-scale structures may be about 100 nm, about 200 nm, about 400 nm, about 600 nm, about 800 nm, about 1 µm, about 2 µm, about 5 µm, or about µm.

The plurality of micro- or nano-scale structures may be made of a variety of materials including, but not limited to, a glass, a polymer, or a combination thereof. In some embodiments, the glass may include, but is not limited to, one or more of soda-lime glass, quartz glass, borosilicate glass, acrylic glass, sugar glass, isinglass (Muscovy glass), aluminum oxynitride, and the like. Further, the polymer may be, without limitation, one or more of acryl resin, polycarbonate, polyester, cellulose, polyethylene, polyethylene terephthalate, polypropylene, polyolefin, polyvinyl chloride, phenolic resin, polyvinyl butyral, and polyurethane. In some embodiments, the plurality of micro- or nano-scale structures may be made of the same material as the transparent substrate.

In certain embodiments, the plurality of micro- or nano-scale structures may be formed in a predetermined or random pattern. For example, in some embodiments, the plurality of micro- or nano-scale structures may be formed in a grid-like pattern with similar sizes, shapes and gaps, as depicted in FIG. 10. In other embodiments, the plurality of micro- or nano-scale structures may be formed in a repeating dimple pattern, as depicted in FIG. 11. Different patterns of the plurality of micro- or nano-scale structures may be determined by various factors such as size, shape, design, arrangement method, etc.

The increased surface roughness caused by the recessed and raised formations of the plurality of micro- or nano-scale structures 102 of the transparent structure 100 and the chemical property of the plurality of micro- or nano-scale structures 102 enhance the water repellency or hydrophilicity of the transparent structure 100. For example, a chemically hydrophobic substrate can become superhydrophobic due to the increased surface roughness caused by the plurality of micro- or nano-scale structures on the substrate, while a chemically hydrophilic substrate can become superhydrophilic due to the enhanced surface roughness. The increased hydrophobicity/ hydrophilicity, i.e., superhydrophobicity/superhydrophilicity, and anti-adhesion properties resulting from the complex micro- or nano-scale architecture of the surface minimize the adhesion of substances to the surface, imparting self-cleaning properties to the surface. For example, dirt particles on such surfaces can be picked up by water droplets and are easily cleaned off the surface.

The substance 103 configured to block near-infrared or infrared radiation may include, without limitation, a metal, a near-infrared radiation absorbent, an infrared radiation reflecting material, or a combination thereof. The metal may be, but is not limited to, one or more of Au, Ag, Cu, and Al. The near-infrared radiation (wavelength: approximately 780 nm-1300 nm) absorbent may be, without limitation, one or more of a polymethine type compound, phthalocyanine type compound, naphthalocyanine type compound, metal complex type compound, aminium type compound, immonium type compound, diimmonium type compound, anthraquinone type compound, dithiol metal complex type compound, naphthoquinone type compound, indolphenol type compound, azo type compound, and triallylmethane type compound. The infrared radiation (wavelength: approximately >780 nm) reflecting material may be, without limitation, one or more of tin oxide, titanate, aluminate, iron oxide, chromium oxide, ultramarine, mica powder covered with titanium oxide, and rare-earth sulfides.

The substance 103 may be configured to partially or completely cover at least substantial portions of one or more of the substrate 101 and the plurality of the micro- or nano-scale structures 102. In some embodiments, "substantial portions" may include from about 3% to about 90%, from about 5% to about 90%, from about 10% to about 90%, from about 20% to about 90%, from about 30% to about 90%, from about 40% to about 90%, from about 50% to about 90%, from about 60% to about 90%, from about 70% to about 90%, from about 80% to about 90%, from about 3% to about 5%, from about 3% to about 10%, from about 3% to about 20%, from about 3% to about 30%, from about 3% to about 40%, from about 3% to about 50%, from about 3% to about 60%, from about 3% to about 70%, from about 3% to about 80%, from about 5% to about 10%, from about 10% to about 20%, from about 20% to about 30%, from about 30% to about 40%, from about 40% to about 50%, from about 50% to about 60%, from about 60% to about 70%, or from about 70% to about 80% of the entire surface area of one or more of the substrate 101 and the plurality of the micro- or nano-scale structures 102. In other embodiments, "substantial portions" may include about 3%, about 5%, about 10%, about 20%, about 30%, about 40%, about 50%, about 60%, about 70%, about 80%, or about 90% of the entire surface area of one or more of the substrate 101 and the plurality of the micro- or nano-scale structures 102.

The thickness or dimensions of the substance 103 may depend on the overall transparency of the transparent structure 100, as well as the geometrical configuration of the plurality of micro- or nano-scale structures 102. The general thickness or dimensions of the substance 103 may be selected such that the overall transparency of the manufactured transparent structure 100 is not substantially reduced and visible light is allowed to pass through the transparent structure 100. In general, transparent structures may have a transmittance of at least about 60% within the range of visible light (approximately 380 nm-780 nm). For example, the transparent structures described herein may have a transmittance of at least about 60%, at least about 70%, at least about 80%, or at least about 90%, within the range of visible light. Thus, the general thickness or dimensions of the substance 103 in the transparent structure described herein may be selected such that the transparency of the manufactured transparent structure is reduced by e.g., 10% or less, 20% or less, 30% or less, or 40% or less.

The substance 103 may have, without limitation, a general thickness or dimensions of from about 5 nm to 300 nm. In some embodiments, the general thickness or dimensions of the substance 103 may range from about 10 nm to about 300 nm, about 20 nm to about 300 nm, about 40 nm to about 300 nm, about 60 nm to about 300 nm, from about 80 nm to about 300 nm, from about 100 nm to about 300 nm, from about 120 nm to about 300 nm, from about 140 nm to about 300 nm, from about 160 nm to about 300 nm, from about 180 nm to about 300 nm, from about 200 nm to about 300 nm, from about 250 nm to about 300 nm, from about 5 nm to about 10 nm, from about 5 nm to about 20 nm, from about 5 nm to about 40 nm, from about 5 nm to about 60 nm, from about 5 nm to about 80 nm, from about 5 nm to about 100 nm, from about 5 nm to about 120 nm, from about 5 nm to about 140 nm, from about 5 nm to about 160 nm, from about 5 nm to about 180 nm, from about 5 nm to about 200 µm, from about 5 nm to about 250 µm, from about 10 nm to about 20 nm, from about 20 nm to about 40 nm, from about 40 nm to about 60 nm, from about 60 nm to about 80 nm, from about 80 nm to about 100 nm, from about 100 nm to about 120 nm, from about 120 nm to about 140 nm, from about 140 nm to about 160 nm, from about 160 nm to about 180 nm, from about 180 nm to about 200 nm, or from about 200 nm to about 250 nm. In other embodiments, the thickness or dimensions of the substance 103 may be about 5 nm, about 10 nm, about 20 nm, about 40 nm, about 60 nm, about 80 nm, about 100 nm, about 120 nm, about 140 nm, about 160 nm, about 180 nm, about 200 nm, about 250 nm, or about 300 nm.

The substance 103 with certain microstructure or nanostructure dimensions can absorb light in the near-infrared or infrared radiation region (i.e., heat) and trap the heat on the surface of the transparent structure 100, thereby blocking the near-infrared or infrared radiation. This decreases the amount of near-infrared or infrared radiation going through the transparent structure 100, resulting in a decrease in subsequent radiative heating behind the transparent structure 100, i.e., on the side of the transparent structure 100 which is opposite to that on which light is emitted. For example, when the transparent structure 100 is used as a window in an automobile, the substance 103 can block the near-infrared or infrared radiation and prevent the inside of the automobile from being heated.

In some embodiments, the transparent structure 100 optionally includes at least one transparent conductive substance 104. The at least one transparent conductive substance 104 may include, by way of non-limiting example, a metal oxide, a conductive polymer, or a combination thereof. In some embodiments, the metal oxide may include, without limitation, one or more of indium tin oxide (ITO), indium tin oxide/carbon nanotube (ITO/CNT), and antimony tin oxide (ATO). The conductive polymer may be, without limitation, one or more of polyaniline, polyimide, polyester, polyacetylene, polypyrrole, polythiophene, poly-p-phenylenevinylene, polyepoxide, polydimethylsiloxane, polyacrylate, poly methyl methacrylate, cellulose acetate, polystyrene, polyolefin, polymethacrylate, polycarbonate polysulphone, polyethersulphone, and polyvinyl acetate.

Figure 2:
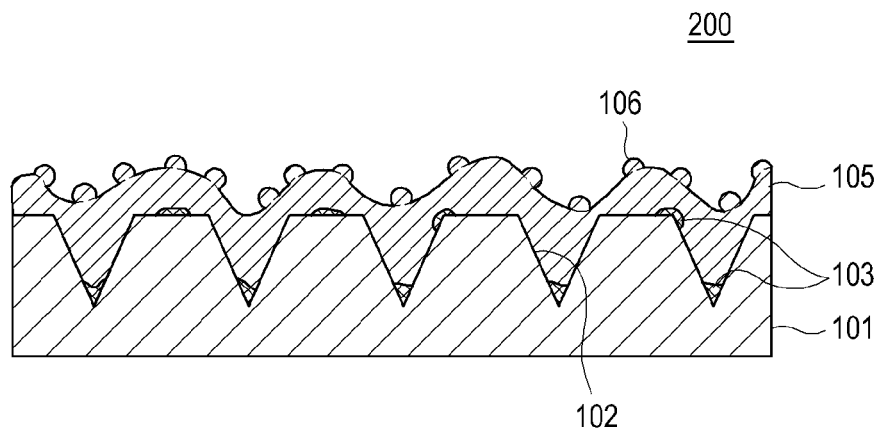
FIG. 2 shows another illustrative embodiment of a transparent structure.

In certain embodiments, the at least one transparent conductive substance 104 of the transparent structure 100 may not be present in the transparent structure 200, as illustrated in FIG. 2.

The electrical conductivity of the at least one transparent conductive substance 104 may be utilized to heat the transparent structure 100 while maintaining the transparency of the transparent structure 100. For example, due to its electrical conductivity, the at least one transparent conductive substance 104, when connected to a power source, can be used to electrically heat the transparent conductive substance 104 and melt or prevent ice formation on a window and provide defrosting capabilities at high humidity or low temperature conditions. Further, the transparency of the at least one transparent conductive substance 104 provides great freedom in designing the transparent structure 100. For example, while metallic meshes that have typically been used as rear-window defrosters in automobiles are prohibited from being used as a defroster in front windows due to safety issues (since metal is not transparent), the at least one transparent conductive substance 104 may be used as a front-window defroster because it can provide transparency, as well as defrosting capability.

The at least one transparent conductive substance 104 may have, without limitation, a thickness of from about 10 nm to about 10 µm. In some embodiments, the thickness of the at least one transparent conductive substance 104 may range from about 20 nm to about 10 µm, from about 40 nm to about 10 µm, from about 60 nm to about 10 µm, from about 80 nm to about 10 µm, from about 100 nm to about 10 µm, from about 200 nm to about 10 µm, from about 400 nm to about 10 µm, from about 600 nm to about 10 µm, from about 800 nm to about 10 µm, from about 1 µm to about 10 µm, from about 2 µm to about 10 µm, from about 5 µm to about 10 µm, from about 10 nm to about 20 nm, from about 10 nm to about 40 nm, from about 10 nm to about 60 nm, from about 10 nm to about 80 nm, from about 10 nm to about 100 nm, from about 10 nm to about 200 nm, from about 10 nm to about 400 nm, from about 10 nm to about 600 nm, from about 10 nm to about 800 nm, from about 10 nm to about 1 µm, from about 10 nm to about 2 µm, from about 10 nm to about 5 µm, from about 20 nm to about 40 nm, from about 40 nm to about 60 nm, from about 60 nm to about 80 nm, from about 80 nm to about 100 nm, from about 100 nm to about 200 nm, from about 200 nm to about 400 nm, from about 400 nm to about 600 nm, from about 600 nm to about 800 nm, from about 800 nm to about 1 µm, from about 1 µm to about 2 µm, or from about 2 µm to about 5 µm. In other embodiments, the thickness of the at least one transparent conductive substance 104 may be about 10 nm, about 20 nm, about 40 nm, about 60 nm, about 80 nm, about 100 nm, about 200 nm, about 400 nm, about 600 nm, about 800 nm, about 1 µm, about 2 µm, about 5 µm, or about 10 µm.

In some embodiments, only the at least one photocatalyst 105 in the form of a layer may be formed on the outermost surface of the transparent structure 100 without at least one photocatalyst 106 in the form of protrusions. The at least one photocatalyst 105 may partially or completely cover the outermost surface which may be the surface of the at least one transparent conductive substance 104 or the surface of the substance 103 and the plurality of micro- or nano-scale structures 102 when the at least one transparent conductive substance 104 is not present in the transparent structure (as in FIG. 2).

The at least one photocatalyst 105 may have, without limitation, a thickness of from about 20 nm to about 500 nm. In some embodiments, the thickness of the at least one photocatalyst 105 may range from about 40 nm to about 500 nm, from about 60 nm to about 500 nm, from about 80 nm to about 500 nm, from about 100 nm to about 500 nm, from about 150 nm to about 500 nm, from about 200 nm to about 500 nm, from about 300 nm to about 500 nm, from about 400 nm to about 500 nm, from about 20 nm to about 40 nm, from about 20 nm to about 60 nm, from about 20 nm to about 80 nm, from about 20 nm to about 100 nm, from about 20 nm to about 150 nm, from about 20 nm to about 200 nm, from about 20 nm to about 300 nm, from about 20 nm to about 400 nm, from about 40 nm to about 60 nm, from about 60 nm to about 80 nm, from about 80 nm to about 100 nm, from about 100 nm to about 150 nm, from about 150 nm to about 200 nm, from about 200 nm to about 300 nm, or from about 300 nm to about 400 nm. In other embodiments, the thickness of the at least one photocatalyst 105 may be about 20 nm, about 40 nm, about 60 nm, about 80 nm, about 100 nm, about 150 nm, about 200 nm, about 300 nm, about 400 nm, or about 500 nm.

Figure 3:
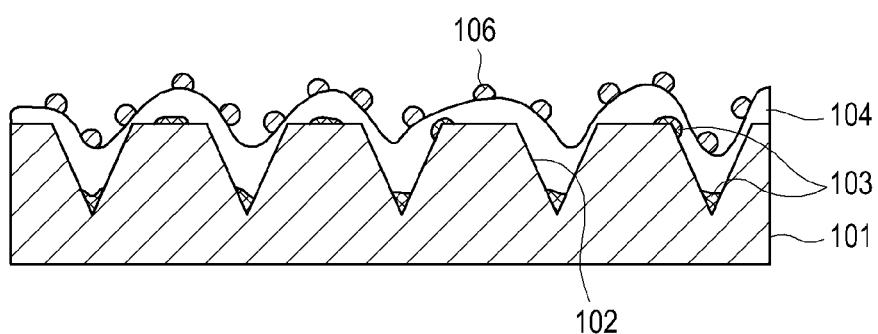
FIG. 3 shows another illustrative embodiment of a transparent structure.

In other embodiments, as illustrated in FIG. 3, the at least one photocatalyst 106 may be configured to exist in the form of protrusions on the outermost surface of the transparent structure and may be formed directly on the at least one transparent conductive substance 104 without at least one photocatalyst 105 in the form of a layer.

In certain embodiments, the at least one photocatalyst 106 in the form of protrusions may be formed on the at least one photocatalyst 105 in the form of a layer, as illustrated in FIG. 1. When the protrusions of the at least one photocatalyst 106 are made of a material which is identical to the material for the at least one photocatalyst 105, the structural integrity of the protrusions of the at least one photocatalyst 106 may be enhanced due to the strengthened bond between the at least one photocatalyst 105 and at least one photocatalyst 106.

The at least one photocatalyst 105, 106 may include, without limitation, $TiO_2$, $ZnO$, $SnO_2$, $CdS$, $ZrO_2$, $V_2O_2$, $WO_3$, $SrTiO_3$, or a combination thereof. Doped metal oxides, such as but not limited to, N-doped $TiO_2$, C-doped $TiO_2$, Cr-doped $TiO_2$, Mn-doped $TiO_2$, Co-doped $TiO_2$ may also be used for the at least one photocatalyst 105, 106. $TiO_2$, $ZnO$, and $SnO_2$ may also impart ultraviolet ray reflecting properties to the transparent structure 100. Further, the at least one photocatalyst 105, 106 may cause surface oxidation and eliminate harmful substances, such as organic compounds or bacteria, when it is exposed to the sun or a fluorescent lamp.

The at least one photocatalyst 106 in the form of protrusions may have, without limitation, an average size of from about 50 nm to about 250 nm. In some embodiments, the average size of the at least one photocatalyst 106 in the form of protrusions may range from about 60 nm to about 250 nm, from about 70 nm to about 250 nm, from about 80 nm to about 250 nm, from about 90 nm to about 250 nm, from about 100 nm to about 250 nm, from about 120 nm to about 250 nm, from about 140 nm to about 250 nm, from about 160 nm to about 250 nm, from about 180 nm to about 250 nm, from about 200 nm to about 250 nm, from about 50 nm to about 60 nm, from about 50 nm to about 70 nm, from about 50 nm to about 80 nm, from about 50 nm to about 90 nm, from about 50 nm to about 100 nm, from about 50 nm to about 120 nm, from about 50 nm to about 140 nm, from about 50 nm to about 160 nm, from about 50 nm to about 180 nm, from about 50 nm to about 200 µm, from about 60 nm to about 70 nm, from about 70 nm to about 80 µm, from about 80 nm to about 90 nm, from about 90 nm to about 100 nm, from about 100 nm to about 120 nm, from about 120 nm to about 140 nm, from about 140 nm to about 160 nm, from about 160 nm to about 180 nm, or from about 180 nm to about 200 nm. In other embodiments, the average size of the at least one photocatalyst 106 in the form of protrusions may be about 50 nm, about 60 nm, about 70 nm, about 80 nm, about 90 nm, about 100 nm, about 120 nm, about 140 nm, about 160 nm, about 180 nm, about 200 nm, or about 250 nm.

In some embodiments, the size of the at least one photocatalyst 106 in the form of protrusions may be generally smaller than that of the plurality of micro- or nano-scale structures 102, so that the final outermost surface of the transparent structure 100 would have an embossed structure due to the protrusions of the at least one photocatalyst 106 in addition to the undulated surface produced by the plurality of micro- or nano-scale structures 102.

Thus, the at least one photocatalyst 106 in the form of protrusions may add an extra three-dimensional surface morphology to the transparent structure 100 in addition to the rough contour caused by the plurality of micro- or nano-scale structures 102, thereby further enhancing the surface roughness and the water repelling quality or hydrophilicity of the outermost surface of the transparent structure 100.

The overall hydrophobicity or hydrophilicity of the transparent structure 100 may be attributed, in part, to the roughened surface morphology caused by the plurality of micro- or nano-scale structures 102 and also the at least one photocatalyst 106 in the form of protrusions. Thus, for example, when the rough surface of the transparent structure 100 resulting from the plurality of micro- or nano-scale structures 102 and the protrusions of the at least one photocatalyst 106 comes into contact with water, the outermost surface of the transparent structure 100 can trap air within the furrowed area, i.e., in the spaces between the protrusions 106 greatly reducing the real contact area between the solid surface of the transparent structure 100 and the water droplet and leading to increased water-repellency (i.e., hydrophobicity) as well as self-cleaning properties.

The hydrophobicity or hydrophilicity of the surface of the transparent structure 100 is optionally enhanced by the characteristics of the at least one photocatalyst 106 coated on the outermost surface of the transparent structure 100. As a non-limiting example, when the at least one photocatalyst 106 is $TiO_2$, the outermost surface of the transparent structure 100 exhibits hydrophilic properties, which may help clean dirt particles off the surface and accelerate drying to minimize spotting and streaking $TiO_2$ as a photocatalyst may provide self-cleaning properties to the transparent structure 100 in two stages (the photocatalytic stage and the hydrophilic stage). The "photocatalytic" stage involves the $TiO_2$ breaking down the organic dirt on the glass having the transparent structure 100 by the ultraviolet light in sunlight. During the following "hydrophilic" stage, water, such as rain, washes away the dirt leaving almost no streaks, because the embossed superhydrophilic $TiO_2$ spreads the water evenly over the surface of the transparent structure 100.

Each deposited substance, such as the substance 103, the at least one transparent conductive substance 104, and the at least one photocatalyst 105, 106, may be configured to coat, in order, the substrate 101 having a rough surface provided by the plurality of micro- or nano-scale structures 102 with a certain dimension or thickness such that the outermost surface of the transparent structure 100 has a contour reflecting that of the rough surface of the substrate 101 on the micro scale.

Referring to FIG. 4, another illustrative embodiment of a transparent structure 400 is shown. In some embodiments, the transparent structure 400 optionally includes one or more of a transparent substrate 101, a plurality of micro- or nano-scale structures 402, substance 103 configured to block near-infrared or infrared radiation, at least one transparent conductive substance 104, and at least one photocatalyst 105, 106. The plurality of micro- or nano-scale structures 402 may be configured to have a recessed shape in the form of U-shaped ditches, as illustrated in FIG. 4. Although shown with sharp angles in this and other figures, in some embodiments, the angles are rounded as suggested by the term U-shaped ditches.

Referring to FIG. 5, another illustrative embodiment of a transparent structure 500 is shown. In some embodiments, the transparent structure 500 optionally includes one or more of a transparent substrate 101, a plurality of micro- or nano-scale structures 502, substance 103 configured to block near-infrared or infrared radiation, at least one transparent conductive substance 104, and at least one photocatalyst 105, 106. The plurality of micro- or nano-scale structures 502 may be configured to have irregular raised formations, as illustrated in FIG. 5.

Referring to FIG. 6, another illustrative embodiment of a transparent structure 600 is shown. In some embodiments, the transparent structure 600 optionally includes one or more of a transparent substrate 101, a plurality of micro- or nano-scale structures 602, substance 103 configured to block near-infrared or infrared radiation, at least one transparent conductive substance 104, and at least one photocatalyst 105, 106. The plurality of micro- or nano-scale structures 602 may be configured to have a raised formation in the shape of semi-spheres, as illustrated in FIG. 6.

Figure 7:
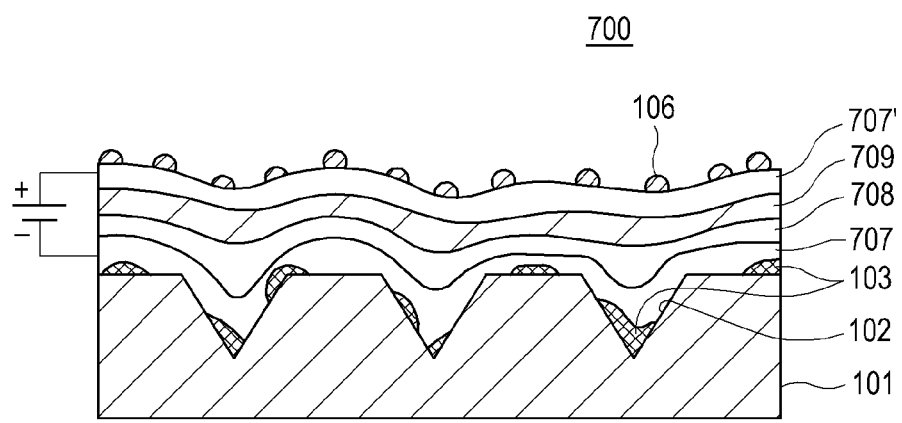
FIG. 7 shows an illustrative embodiment of an electrochromic device.

Referring to FIG. 7, an illustrative embodiment of an electrochromic device 700 is shown. The electrochromic device 700 optionally includes one or more of a transparent substrate 101, a plurality of micro- or nano-scale structures 102 on one side, for example, the front side of the substrate 101, substance 103 configured to block near-infrared or infrared radiation, at least one photocatalyst 106, a pair of electrodes including a first electrode 707 and a second electrode 707', at least one electrochromic material 708, and at least one electrolyte 709. The at least one electrochromic material 708 may be sandwiched between the first and second electrodes 707, 707' and the combination of first electrode 707/electrochromic material 708/second electrode 707' may be interposed between the substance 103 configured to block near-infrared or infrared radiation and the photocatalyst 106 on the front side of the substrate 101, as depicted in FIG. 7. The at least one photocatalyst 106 may be configured to exist in the form of protrusions on the outermost surface of the electrochromic device 700.

The pair of electrodes including the first and second electrodes 707, 707' may be made of a variety of materials including, but not limited to, a metal oxide, a conductive polymer, or a combination thereof. In some embodiments, the metal oxide may include, without limitation, one or more of ITO, ITO/CNT, ATO, fluorine doped tin oxide (FTO), indium doped zinc oxide (IZO), and ZnO. The conductive polymer may be, without limitation, one or more of polyaniline, polyimide, polyester, polyacetylene, polypyrrole, polythiophene, poly-p-phenylenevinylene, polyepoxide, polydimethylsiloxane, polyacrylate, poly methyl methacrylate, cellulose acetate, polystyrene, polyolefin, polymethacrylate, polycarbonate polysulphone, polyethersulphone, polyvinyl acetate. The first and second electrodes 707, 707' may be made of the same material or different materials and may be deposited by methods such as, but not limited to, sputtering, e-beam evaporation, chemical vapor deposition, and sol-gel coating.

Descriptions regarding the components illustrated in FIG. 7, for example, the transparent substrate 101, the plurality of micro- or nano-scale structures 102, the substance 103 configured to block near-infrared or infrared radiation, and the at least one photocatalyst 106 have already been described and illustrated in FIG. 1, and are not repeated herein in their entirety.

The at least one electrochromic material 708 may include one or more of vanadium pentoxide, tungsten oxide, molybdenum oxide, titanium pentoxide tungsten oxide-molybdenum oxide mixtures, niobium pentoxide, cobalt oxide, iridium oxide, and rhodium oxide.

The at least one electrochromic material 708 is capable of changing its optical properties (e.g., from transparent to absorbing/reflecting or from absorbing/reflecting to transparent), when an electric field or current is applied across it, thereby allowing the amount of light and heat passing through to be controlled. For example, the electrochromic device 700 can be applied to an architectural or automotive window having variable transmittance where the opacity of the window (e.g., a colored, translucent state or a transparent state) may be changed so that a desired amount of visible light and/or solar energy would penetrate the window. Such windows may be energy efficient and could be used to maintain a comfortable indoor climate.

Figure 8B:
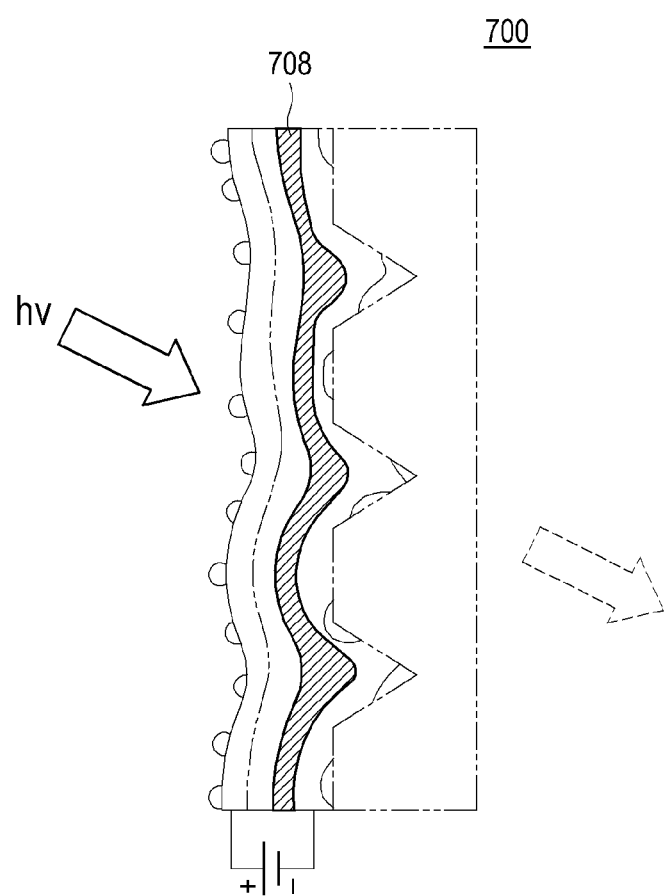

In accordance with one embodiment by way of non-limiting example, FIGS. 8A and 8B depicts the electrochromic device 700 for the above-described window structure in a high transmittance state (FIG. 8A) and a low transmittance state (FIG. 8B). In the high transmittance state where no voltage is applied, the window is optically clear and transmits about 70% to 80% of the incident light (i.e., visible and near-infrared region) (as depicted by the solid arrows in FIG. 8A). The at least one electrochromic material 708 may be tungsten oxide ($WO_3$). When a low dc voltage (e.g., 1-3 Volts) is applied to the electrochromic device 700, ions are introduced into the $WO_3$ film, i.e., the at least one electrochromic material 708, of the electrochromic device 700 to convert the at least one electrochromic material 708 into a low transmittance state. Therefore, in the low transmittance state as depicted in FIG. 8B, a series of electrochemical redox reactions take place to change the light transmission properties of the electrochromic device 700 or window to a dark blue color, for example, near zero transmittance state, where almost no incident light can pass through (as depicted by the dotted arrow in FIG. 8B). By reversing the polarity of the voltage, the window switches reversibly between the low transmittance state and the high transmittance, i.e., transparent, state. The transmission properties of the electrochromic material 708 in the visible range may be governed by the applied voltage differential across the electrochromic material 708. Upon application of a voltage differential, the electrochromic material 708 may exhibit a spectral characteristic between the maximum transmission $T_{max}$ and the minimum transmission $T_{min}$ of the electrochromic material 708 in the visible range. Further, the incorporation of metal oxides (such as vanadium oxide and titanium oxide) in the electrochromic tungsten oxide may reduce the characteristic blue color of the tungsten oxide in the colored state, enabling the transmission degree to be controlled.

The at least one electrolyte 709 carries the ionic current inside the electrochromic device 700 between the first and second electrodes 707, 707' and may be a substance as simple as a salt (e.g., sodium chloride) dissolved in a dissociating solvent, such as water. In certain embodiments, the electrochromic material 708 may be dissolved in the at least one electrolyte 709. In other embodiments, the at least one electrolyte 709 may be gel or solid electrolytes, which are easier to confine in the space between the first and second electrodes 707, 707' and may function to hold together the flanking layers. Further, the use of gel or solid electrolytes minimizes hydrostatic pressure that can cause substrate deformation and leakage problems, particularly in large-area devices, such as smart windows.

Figure 9:
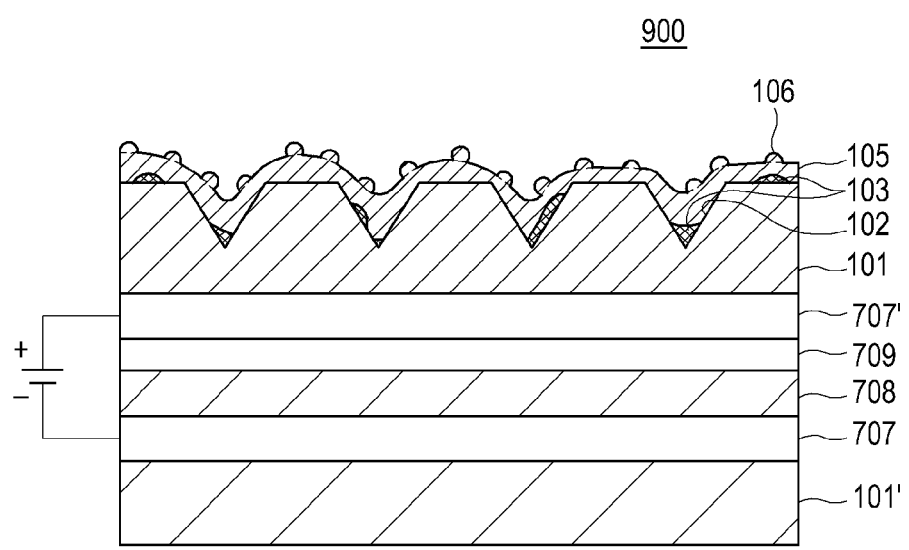
FIG. 9 shows another illustrative embodiment of an electrochromic device.

Referring to FIG. 9, another illustrative embodiment of an electrochromic device 900 is shown. The electrochromic device 900 optionally includes one or more of a transparent substrate 101, 101', a plurality of micro- or nano-scale structures 102, substance 103 configured to block near-infrared or infrared radiation, at least one photocatalyst 105, 106, a first electrode 707' configured to at least partially cover the (back) side of the substrate 101 that does not have the plurality of micro- or nano-scale structures 102, at least one electrolyte 709, and at least one electrochromic material 708 configured to at least partially cover a second electrode 707. The at least one electrochromic material 708 is optionally sandwiched between the first and second electrodes 707, 707', and optionally covers the side of the transparent substrate 101 that does not have the plurality of micro- or nano-scale structures 102, as depicted in FIG. 9. The at least one electrochromic material 908 can be dissolved in an electrolyte 709 or deposited between the first and second electrodes 707', 707. The transparent substrate 101' may optionally include a plurality of micro- or nano-scale structures, substance configured to block near-infrared or infrared radiation, or at least one photocatalyst (e.g. as described for the opposite side) on its side that is not coated with the second electrode 707.

Descriptions regarding the components illustrated in FIG. 9, for example, the first and second electrodes 707', 707, the at least one electrochromic material 708, and the electrolyte 709 have already been described and illustrated in FIG. 7, and are not repeated herein in their entirety.

FIG. 10 shows a perspective view of an illustrative embodiment of a method of forming a plurality of micro- or nano-scale structures having a recessed shape in the form of V-shaped ditches or channels on a substrate.

As shown in FIG. 10, the plurality of micro- or nano-scale structures 102 may be formed on the transparent substrate 101 by scratching the transparent substrate 101 using a cutting device 1010. In certain embodiments, the cutting device 1010 may be placed on the transparent substrate 101 and moved using a mechanical processing unit (e.g., a robotic arm) to scratch the surface of the transparent substrate 101, thereby forming the plurality of micro- or nano-scale structures 102 having a recessed shape in a grid-like pattern. In some embodiments, the cutting device 1010 may be, but not limited to, a nanoscalpel having parallel aligned ridges made of a hard material such as metal carbides. Metal carbides may include but are not limited to, tungsten carbide (WC), titanium carbide (TiC) and tantalum carbide (TaC), which have high hardness and high hot hardness and are thus useful as cutting devices.

In some embodiments, the plurality of micro- or nano-scale structures 102 having a recessed shape may be formed on the transparent substrate 101 by coating the transparent substrate 101 with a protective film (not shown) prior to the scratching, etching the exposed part of the transparent substrate where the protective film has been taken off by the scratching, and removing the remaining protective film. The scratching may be performed by a cutting device such as the nanoscalpel described above. The etching of the exposed part of the transparent substrate may be carried out by a wet etching (isotropic or anisotropic) method or dry etching (reactive ion etching (RIE) or inductively coupled plasma) method. For example, when the transparent substrate is glass, the etching of the glass may be performed by wet etching using a HF-based solution, such as but not limited to, $HF/NH_4F$ and $HF/H_3PO_4$, or by dry etching using a RIE reactor with a gas mixture, such as but not limited to, $CHF_3/Ar$, $CF_4/O_2$, and $CF_4/Ar$.

In certain embodiments, the plurality of micro- or nano-scale structures having a recessed shape 102 may be formed on the transparent substrate 101 by forming a photoresist mask pattern on a transparent substrate coated with a photoresist film by light exposure, etching the exposed part of the transparent substrate, and removing the photoresist film. By way of non-limiting example, removal of the photoresist film may be carried out by exposing the photoresist material to heated solvent vapors, such as but not limited to, isopropanol, 1-methyl-2-pyrrolidon, an alkaline solution and the like.

FIG. 11 shows a perspective view of an illustrative embodiment of another method of forming a plurality of micro- or nano-scale structures having a recessed shape on a substrate. As illustrated in FIG. 11, a plurality of micro- or nano-scale structures 1102 having a recessed shape may be formed on a transparent substrate 101 by stamping the transparent substrate 101 with a roller 1111 having a plurality of projections. In certain embodiments, a partially melted transparent substrate may be used to improve processibility. The roller 1111 may be moved using any mechanical processing unit (e.g., a robotic arm) to stamp the surface of the transparent substrate 101, thereby forming the plurality of micro- or nano-scale structures 102 in a repeating dimple pattern.

FIG. 12 shows a perspective view of an illustrative embodiment of a method of forming a plurality of micro- or nano-scale structures having a raised shape on a substrate. As illustrated in FIG. 12, a plurality of micro- or nano-scale structures 1202 having a raised formation may be formed on a transparent substrate 101 by applying differential pressure on portions of a transparent substrate 101 using a pressure apparatus 1212. In certain embodiments, a partially melted substrate 101 may be used to improve processibility. In some embodiments, the pressure apparatus 1212 includes a porous article 1213, as illustrated in FIG. 12, and a vacuum device (not shown), where vacuum applied to the partially melted transparent substrate 101 covered with the porous article 1213 may pull portions of the surface of the partially melted transparent substrate 101 through the pores of the porous article to form the plurality of micro- or nano-scale structures 1202 having a raised or protruding shape.

In other embodiments, a plurality of micro- or nano-scale structures having a raised formation may be formed on a transparent substrate by attaching a plurality of protrusions to the transparent substrate.

Figure 13A:
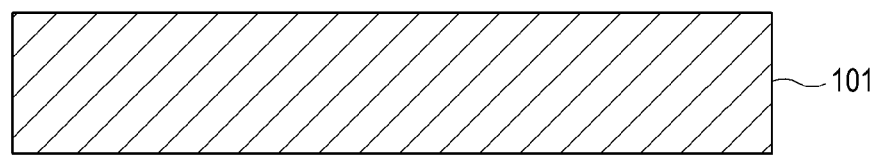
FIGS. 13A-13F are schematic diagrams showing an illustrative embodiment of a method of making a transparent structure.
Figure 13B:
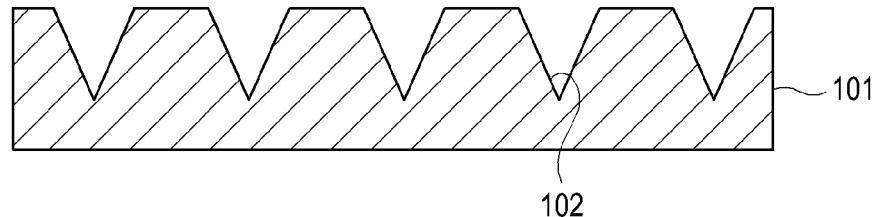

FIGS. 13A-13F are schematic diagrams showing an illustrative embodiment of a method of making a transparent structure. Referring to FIG. 13A, the method of making a transparent structure includes providing a transparent substrate 101. Next, as illustrated in FIG. 13B, a plurality of micro- or nano-scale structures 102 may be formed on at least one side of the transparent substrate 101 to provide a rough surface on the substrate 101 by, for example, any one of the methods as described above. In some embodiments, the plurality of micro- or nano-scale structures 102 are optionally configured to have a recessed shape as depicted in FIG. 13B by, for example, scratching the transparent substrate 101 using a cutting device such as a nanoscalpel. In other embodiments, the plurality of micro- or nano-scale structures are optionally configured to have a raised or protruding shape as depicted in FIGS. 5-6 and 12.

Figure 13C:
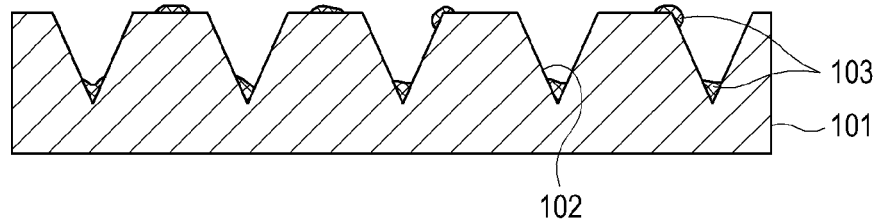

Referring to FIG. 13C, substance 103 configured to block near-infrared or infrared radiation is deposited on at least substantial portions of the substrate 101 and the plurality of micro- or nano-scale structures 102. The substance 103 may be deposited by methods such as, but not limited to, dip coating, roll coating, spray coating, gravure coating, comma coating, and die coating. When the substance 103 is metal, the substance 103 may be deposited by methods such as, but not limited to, vapor phase epitaxy, vacuum evaporation, sputter deposition, and plasma enhancement chemical vapor deposition (PECVD).

Figure 13D:
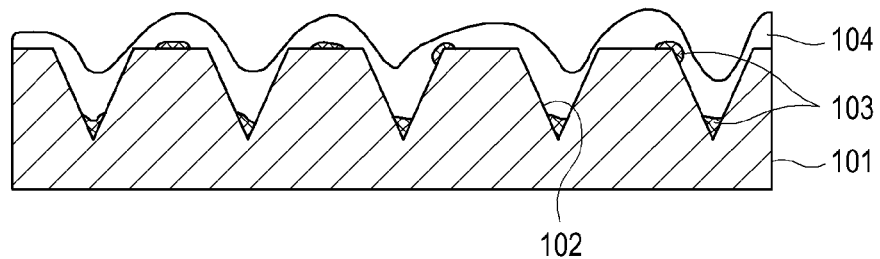

In some embodiments, the method of making a transparent structure optionally includes depositing at least one transparent conductive substance 104 on at least substantial portions of the substrate 101 and the plurality of micro- or nano-scale structures 102, prior to the coating at least substantial portions of the outermost surface of the transparent structure 100 with at least one photocatalyst, as depicted in FIG. 13D. The at least one transparent conductive substance 104 may be deposited by methods including, but not limited to, spray coating, roller coating, dip coating, spin coating, doctor blade coating, screenprinting, thermal evaporation, e-beam evaporation, vacuum evaporation, high-density plasma assist evaporation, ion plating, sputtering, chemical vapor deposition, metal organic chemical vapor deposition, non-vacuum spray deposition, molecular beam epitaxy, and radiofrequency (RF) magnetron sputtering.

Figure 13E:
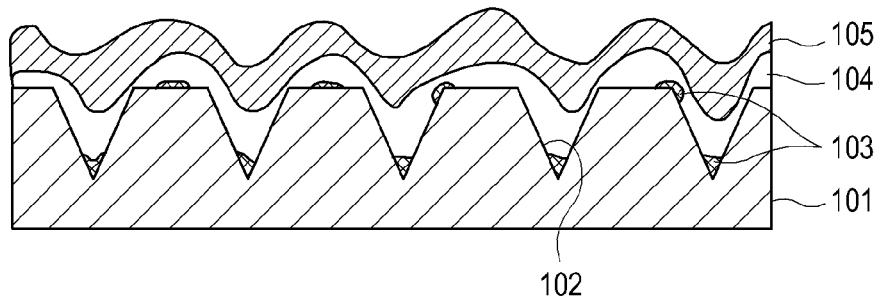
Figure 13F:
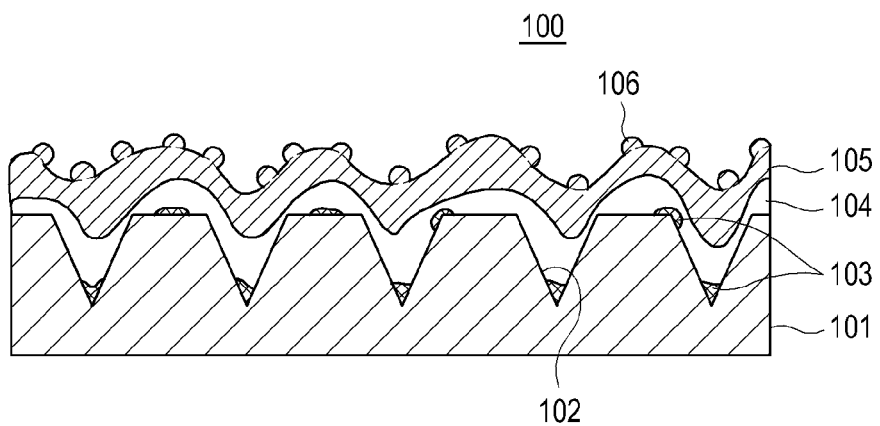

Referring to FIGS. 13E-F, the method of making a transparent structure optionally includes coating at least substantial portions of the outermost surface of the transparent structure 100 with at least one photocatalyst 105, 106. The coating at least substantial portions of an outermost surface of the transparent structure 100 with at least one photocatalyst 105, 106 may be carried out by methods such as, but not limited to, deep coating, spray coating, roller coating, flow coater coating, evaporation deposition, sputtering deposition, ion plating, plasma polymerization, and sol-gel coating.

As already described above, the at least one photocatalyst 105, 106 may be configured to coat the substrate 101 having the plurality of micro- or nano-scale structures 102 with a certain dimension or thickness such that the outermost surface of the transparent structure 100 has a contour reflecting that of the rough surface of the substrate 101 on the micro scale. For example, nanoparticles of the at least one photocatalyst may be deposited to coat at least substantial portions of the outermost surface of the transparent structure 100. The amount and size of the nanoparticles of the at least one photocatalyst may be controlled depending on whether the at least one photocatalyst 105, 106 is to be coated in the form of a layer or protrusions.

In some embodiments, the method of making a transparent structure optionally includes coating at least substantial portions of an outermost surface of the transparent structure 100 with at least one photocatalyst 105 in the form of a layer as illustrated in FIG. 13E, prior to forming the protrusions of the at least one photocatalyst 106 on the outermost surface of the transparent structure 100, as illustrated in FIG. 13F. The thickness of the at least one photocatalyst 105 coated on the outermost surface of the transparent structure 100 may be adjusted as described above.

When the protrusions of the at least one photocatalyst 106 are made of a material which is identical to the material for the at least one photocatalyst 105, the structural integrity of the protrusions of the at least one photocatalyst 106 could be enhanced due to the strengthened bond between the at least one photocatalyst 105, 106.

The method of making a transparent structure may further include heating the transparent structure 100 under conditions effective to enhance the structural integrity of the transparent structure. The heating temperature can generally be determined by routine experimentation. By way of non-limiting example, the heating may be carried out at a temperature of from about 80° C. to about 1400° C. In some embodiments, the temperature for the heat treatment may range from about 100° C. to about 1400° C., from about 200° C. to about 1400° C., from about 400° C. to about 1400° C., from about 600° C. to about 1400° C., from about 800° C. to about 1400° C., from about 1000° C. to about 1400° C., from about 1200° C. to about 1400° C., from about 80° C. to about 100° C., from about 80° C. to about 200° C., from about 80° C. to about 400° C., from about 80° C. to about 600° C., from about 80° C. to about 800° C., from about 80° C. to about 1000° C., from about 80° C. to about 1200° C., from about 100° C. to about 200° C., from about 200° C. to about 400° C., from about 400° C. to about 600° C., from about 600° C. to about 800° C., from about 800° C. to about 1000° C., or from about 1000° C. to about 1200° C. In other embodiments, the temperature for the heat treatment may be about 80° C., about 100° C., about 200° C., about 400° C., about 600° C., about 800° C., about 1000° C., about 1200° C., or about 1400° C.

The heat treatment may be carried out for, for example, from about 1 minute to 10 hours. In some embodiments, the time for the heat treatment may range from about 5 minutes to about 10 hours, from about 10 minutes to about 10 hours, from about 20 minutes to about 10 hours, from about 40 minutes to about 10 hours, from about 1 hour to about 10 hours, from about 2 hours to about 10 hours, from about 4 hours to about 10 hours, from about 6 hours to about 10 hours, from about 8 hours to about 10 hours, from about 1 minute to about 5 minutes, from about 1 minute to about 10 minutes, from about 1 minute to about 20 minutes, from about 1 minute to about 40 minutes, from about 1 minute to about 1 hour, from about 1 minute to about 2 hours, from about 1 minute to about 4 hours, from about 1 minute to about 6 hours, from about 1 minute to about 8 hours, from about 5 minutes to about 10 minutes, from about 10 minutes to about 20 minutes, from about 20 minutes to about 40 minutes, from about 40 minutes to about 1 hour, from about 1 hour to about 2 hours, from about 2 hours to about 4 hours, from about 4 hours to about 6 hours, or from about 6 hours to about 8 hours. In other embodiments, the time for the heat treatment may be about 1 minute, about 5 minutes, about 10 minutes, about 20 minutes, about 40 minutes, about 1 hour, about 2 hours, about 4 hours, about 6 hours, about 8 hours, or about 10 hours.

In another aspect, a method for making an electrochromic device includes forming a plurality of micro- or nano-scale structures on one side of a transparent substrate to provide a rough surface on the substrate, depositing at least one substance configured to block near-infrared or infrared radiation on at least substantial portions of the substrate and the plurality of micro- or nano-scale structures, and coating at least substantial portions of an outermost surface of the electrochromic device with at least one photocatalyst. The coating at least substantial portions of the outermost surface of the electrochromic device with at least one photocatalyst may be carried out by depositing nanoparticles of the at least one photocatalyst and by methods such as, but not limited to, deep coating, spray coating, roller coating, flow coater coating, evaporation deposition, sputtering deposition, ion plating, plasma polymerization, and sol-gel coating. In some embodiments, the method may further include, prior to the coating at least substantial portions of an outermost surface of the electrochromic device, depositing a first electrode on the one side of the transparent substrate having the plurality of micro- or nano-scale structures, forming an electrochromic film of at least one electrochromic material on the first electrode, and then depositing a second electrode on the electrochromic film. In other embodiments, the method may further include, before forming a plurality of micro- or nano-scale structures on one side of the transparent substrate, depositing a first electrode on the side of the transparent substrate that does not have the plurality of micro- or nano-scale structures, forming an electrochromic film of at least one electrochromic material on the first electrode, and then depositing a second electrode on the electrochromic film. The method for making an electrochromic device may further include heating the electrochromic device under conditions effective to enhance the structural integrity of the electrochromic device.

The electrochromic film of at least one electrochromic material may be formed on the electrode by any of the known deposition methods, such as vacuum evaporation, sputtering, ion plating, and chemical vapor deposition (CVD). For example, a tungsten oxide electrochromic material may be deposited onto the electrode by a physical deposition method, such as reactive sputtering, ion plating, or ion beam sputtering of tungsten in an oxygen/inert gas atmosphere.

In some embodiments, the electrochromic film of at least one electrochromic material may be dissolved in an electrolyte.

The above illustrated transparent structures and electrochromic devices may have surfaces with hydrophobic, self-cleaning, UV-blocking, heat blocking, and defrosting properties, which are useful in various applications, such as windows in buildings and vehicles.

EXAMPLES

The following example is provided for illustration of some of the illustrative embodiments of the present disclosure but is by no means intended to limit their scope.

Example 1

Preparation of a Transparent Structure

A substrate having a plurality of micro- or nano-scale structures with a recessed shape is prepared by the following process. Nano-sized ditches are formed on a flat soda lime glass having a 10 µm thickness by scratching the glass surface with a nanoscalpel made of tungsten carbide and having parallel aligned ridges (dimension: 500 nm).

An aqueous dispersion of Au nanoparticles having a size of 150 nm is added to the glass with the nano-sized ditches and then dried, where the Au nanoparticles are deposited primarily in the bottom of the ditches in the glass.

A thin layer of ITO/CNT is coated as a transparent conductive substance with a 120 nm thickness on the Au nanoparticles and the glass.

A $TiO_2$ sol is spin-coated with a 100 nm thickness over the ITO/CNT layer and then a $TiO_2$ nanoparticle dispersion in water (where the size of the nanoparticles is approximately 60 nm) is spray coated and dried, resulting in an embossed transparent structure.

To enhance the structural integrity of the transparent structure, the prepared transparent structure is heat-treated for 5 hours at 650° C. The Au nanoparticles that are oxidized due to the heat treatment are reduced by applying an electric current (i.e., feeding electrons) through the CNT/ITO layer.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for making a transparent structure, comprising:
   forming a plurality of micro- or nano-scale structures on at least one side of a transparent substrate to provide a rough surface on the transparent substrate;
   depositing at least one substance configured to block near-infrared or infrared radiation on at least substantial portions of the transparent substrate and the plurality of micro- or nano-scale structures; and
   coating at least substantial portions of the transparent substrate having the at least one substance deposited thereon with at least one photocatalyst to define an outermost and uncovered surface of the transparent structure.

2. The method of claim 1, further comprising depositing at least one transparent conductive substance on at least substantial portions of the plurality of micro- or nano-scale structures prior to coating the at least substantial portions of the transparent substrate having the at least one substance deposited thereon.

3. The method of claim 1, wherein forming a plurality of micro- or nano-scale structures comprises scratching the transparent substrate using a cutting device.

4. The method of claim 1, wherein forming a plurality of micro- or nano-scale structures comprises:
   forming a photoresist mask pattern on the transparent substrate coated with a photoresist film by light exposure;
   etching the exposed part of the transparent substrate; and
   removing the photoresist film.

5. The method of claim 1, wherein forming a plurality of micro- or nano-scale structures comprises stamping the transparent substrate when the transparent substrate is at least partially melted.

6. The method of claim 1, wherein forming a plurality of micro- or nano-scale structures comprises attaching a plurality of protrusions to the transparent substrate.

7. The method of claim 1, wherein the at least one substance comprises a metal, a near-infrared radiation absorbent, an infrared radiation reflecting material, or combinations thereof.

8. The method of claim 1, wherein depositing at least one substance configured to block near-infrared or infrared radiation on at least substantial portions of the transparent substrate and the plurality of micro- or nano-scale structures comprises depositing the at least one substance by at least one of dip coating, roll coating, spray coating, gravure coating, comma coating, die coating, vapor phase epitaxy, vacuum evaporation, sputter deposition, or plasma deposition.

9. The method of claim 1, wherein coating at least substantial portions of the transparent substrate having the at least one substance deposited thereon with at least one photocatalyst to define an outermost and uncovered surface of the transparent structure comprises:

coating the at least one photocatalyst on the at least substantial portions of the transparent substrate by at least one of deep coating, spray coating, roller coating, flow coater coating, evaporation deposition, sputtering deposition, ion plating, plasma polymerization, or sol-gel coating.

10. The method of claim 1, wherein the at least one photocatalyst comprises at least one oxide.

11. The method of claim 10, wherein the at least one oxide comprises $TiO_2$, $ZnO$, $SnO_2$, $CdS$, $ZrO_2$, $V_2O_2$, $WO_3$, $SrTiO_3$, or combinations thereof.

12. A method for making an at least partially transparent structure, comprising:

forming a plurality of micro- or nano-scale structures on a surface of an at least partially transparent substrate to provide a rough surface thereon;

depositing at least one substance configured to at least partially block near-infrared or infrared radiation on the surface of the at least partially transparent substrate having the plurality of micro- or nano-scale structures; and coating at least part of the surface of the at least partially transparent substrate having the at least one substance deposited thereon with at least one photocatalyst to define an outermost and uncovered surface of the at least partially transparent structure.

13. The method of claim 12, wherein forming a plurality of micro- or nano-scale structures comprises forming at least one of a plurality recesses or protrusions on the surface of the at least partially transparent substrate.

14. The method of claim 12, wherein the at least one photocatalyst defines an exterior surface of the at least partially transparent structure.

15. The method of claim 12, wherein coating at least part of the surface of the at least partially transparent substrate having the at least one substance deposited thereon with at least one photocatalyst to define an outermost and uncovered surface of the at least partially transparent structure comprises substantially covering the at least one substance and the plurality of micro- or nano-scale structures with the at least one photocatalyst.

16. A method of making an electrochromic device, comprising:

forming an at least partially transparent structure including:

forming a plurality of micro- or nano-scale structures on a surface of an at least partially transparent substrate to provide a rough surface thereon;

depositing at least one substance configured to at least partially block near-infrared or infrared radiation on the surface of the at least partially transparent substrate having the plurality of micro- or nano-scale structures; and coating at least part of the surface of the at least partially transparent substrate having the at least one substance deposited thereon with at least one photocatalyst to define an outermost surface of the transparent structure; and forming an electrochromic device including an electrochromic material that is operable to reversibly change the electrochromic material between a low transmittance state and a high transmittance state to control an amount of light that is transmitted through the at least partially transparent structure.

17. The method of claim 16, wherein forming an electrochromic device including an electrochromic material comprises:

forming a first electrode over the at least one substance and the plurality of micro- or nano-scale structures;

providing the electrochromic material over the first electrode; and forming a second electrode over the electrochromic material.

18. The method of claim 17, wherein the electrochromic material comprises at least one oxide selected from the group consisting of vanadium pentoxide, tungsten oxide, molybdenum oxide, titanium pentoxide tungsten oxide-molybdenum oxide mixtures, niobium pentoxide, cobalt oxide, iridium oxide, and rhodium oxide.

19. The method of claim 16, wherein forming an electrochromic device including an electrochromic material comprises:

forming a first electrode adjacent to a back surface of the at least partially transparent substrate opposite the surface on which the at least one substance and the plurality of micro- or nano-scale structures are formed;

forming a second electrode; and providing the electrochromic material between the first and second electrodes.

20. The method of claim 19, wherein the electrochromic material comprises at least one oxide selected from the group consisting of vanadium pentoxide, tungsten oxide, molybdenum oxide, titanium pentoxide tungsten oxide-molybdenum oxide mixtures, niobium pentoxide, cobalt oxide, iridium oxide, and rhodium oxide.

* * * * *

UNITED STATES PATENT AND TRADEMARK OFFICE
CERTIFICATE OF CORRECTION

PATENT NO. : 8,432,604 B2
APPLICATION NO. : 13/151080
DATED : April 30, 2013
INVENTOR(S) : Lee It is certified that error appears in the above-identified patent and that said Letters Patent is hereby corrected as shown below:

On the Title Page, in Item (56), under "OTHER PUBLICATIONS", in Column 2, Line 1, delete "al" and insert -- al., --, therefor.

On the Title Page, in Item (56), under "OTHER PUBLICATIONS", in Column 2, Line 3, delete "films"" and insert -- films," --, therefor.

In the Specification

In Column 3, Line 33, delete "bout" and insert -- about --, therefor.

In Column 3, Line 36, delete "an to about" and insert -- to about --, therefor.

In Column 3, Line 44, delete "an to 2cm," and insert -- to about 2cm, --, therefor.

In Column 4, Line 22, delete "about μm," and insert -- about 5 μm, --, therefor.

In Column 4, Line 29, delete "about μm." and insert -- about 10 μm. --, therefor.

In Column 5, Line 17, delete "indolphenol" and insert -- indophenol --, therefor.

In Column 5, Line 18, delete "triallylmethane" and insert -- triarylmethane --, therefor.

In Column 11, Lines 66-67, delete "first electrode 707'" and insert -- first electrode 707 --, therefor.

In Column 12, Line 4, delete "second electrode 707." and insert -- second electrode 707'. --, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,432,604 B2

In Column 12, Line 12, delete "first and second electrodes 707', 707." and
insert -- first and second electrodes 707, 707'. --, therefor.

In Column 12, Line 17, delete "second electrode 707." and
insert -- second electrode 707'. --, therefor.

In Column 12, Line 19, delete "first and second electrodes 707', 707," and
insert -- first and second electrodes 707, 707', --, therefor.

UNITED STATES PATENT AND TRADEMARK OFFICE
CERTIFICATE OF CORRECTION

PATENT NO. : 8,432,604 B2
APPLICATION NO. : 13/151080
DATED : April 30, 2013
INVENTOR(S) : Lee It is certified that error appears in the above-identified patent and that said Letters Patent is hereby corrected as shown below:

On the Title Page, in Item (56), under "OTHER PUBLICATIONS", in Column 2, Line 1, delete "al" and insert -- al., --, therefor.

On the Title Page, in Item (56), under "OTHER PUBLICATIONS", in Column 2, Line 3, delete "films"" and insert -- films," --, therefor.

In the Specification

In Column 3, Line 33, delete "bout" and insert -- about --, therefor.

In Column 3, Line 36, delete "an to about" and insert -- to about --, therefor.

In Column 3, Line 37, delete "an to about 5 cm, from about 100μm an to about 5 cm," and insert -- to about 5 cm, from about 100μm to about 5 cm, --, therefor.

In Column 3, Line 38, delete "an to about 5cm," and insert -- to about 5cm, --, therefor.

In Column 3, Lines 39-40, delete "an to about 1μm," and insert -- to about 1μm, --, therefor.

In Column 3, Line 40, delete "an to about 5μm," and insert -- to about 5μm, --, therefor.

In Column 3, Line 41, delete "an to about 10μm, from about 0.1μm an to about 50" and insert -- to about 10μm, from about 0.1μm to about 50 --, therefor.

In Column 3, Line 42, delete "an to about 100μm," and insert -- to about 100μm, --, therefor.

This certificate supersedes the Certificate of Correction issued July 16, 2013.

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,432,604 B2

In Column 3, Line 43, delete "an to about 500μm, from about 0.1μm an to about 1 cm," and insert -- to about 500μm, from about 0.1μm to about 1 cm, --, therefor.

In Column 3, Line 44, delete "an to 2 cm, from about 1μm an to about 5μm," and insert -- to 2 cm, from about 1μm to about 5μm, --, therefor.

In Column 3, Line 45, delete "an to about" and insert -- to about --, therefor.

In Column 3, Line 46, delete "an to about 100μm," and insert -- to about 100μm, --, therefor.

In Column 3, Line 47, delete "an to about 500μm, from about 500μm an to about 1 cm," and insert -- to about 500μm, from about 500μm to about 1 cm, --, therefor.

In Column 4, Line 22, delete "about μm," and insert -- about 5 μm, --, therefor.

In Column 4, Line 29, delete "about μm." and insert -- about 10 μm. --, therefor.

In Column 5, Line 17, delete "indolphenol" and insert -- indophenol --, therefor.

In Column 5, Line 18, delete "triallylmethane" and insert -- triarylmethane --, therefor.

In Column 11, Lines 66-67, delete "first electrode 707'" and insert -- first electrode 707 --, therefor.

In Column 12, Line 4, delete "second electrode 707." and insert -- second electrode 707'. --, therefor.

In Column 12, Line 12, delete "first and second electrodes 707', 707." and insert -- first and second electrodes 707, 707'. --, therefor.

In Column 12, Line 17, delete "second electrode 707." and insert -- second electrode 707'. --, therefor.

In Column 12, Line 19, delete "first and second electrodes 707', 707," and insert -- first and second electrodes 707, 707', --, therefor.